US010771383B2

(12) United States Patent
Nagarajan et al.

(10) Patent No.: US 10,771,383 B2
(45) Date of Patent: Sep. 8, 2020

(54) COORDINATING PSEUDOWIRE CONNECTION CHARACTERISTICS AND MULTI-HOMED PROVIDER EDGE DEVICE CAPABILITIES

(71) Applicant: Juniper Networks, Inc., Sunnyvale, CA (US)

(72) Inventors: Vikram Nagarajan, Bangalore (IN); Robert W. Kebler, Newburyport, MA (US); Kapil Arora, Bangalore (IN); Himanshu Agarwal, Bangalore (IN); Soumyodeep Joarder, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 182 days.

(21) Appl. No.: 16/018,943

(22) Filed: Jun. 26, 2018

(65) Prior Publication Data
US 2019/0394123 A1  Dec. 26, 2019

(51) Int. Cl.
*H04L 12/721*  (2013.01)
*H04L 12/46*  (2006.01)
*H04L 12/24*  (2006.01)

(52) U.S. Cl.
CPC ........ *H04L 45/68* (2013.01); *H04L 12/4641* (2013.01); *H04L 41/0813* (2013.01); *H04L 45/66* (2013.01)

(58) Field of Classification Search
CPC . H04L 45/68; H04L 12/4641; H04L 12/4679; H04L 45/66; H04L 41/08–0803; H04L 41/0813–0816
See application file for complete search history.

(56) References Cited

U.S. PATENT DOCUMENTS

| 9,019,814 B1 | 4/2015 | Mohanty et al. |
| 2014/0022890 A1 | 1/2014 | Dong et al. |
| 2016/0119229 A1 | 4/2016 | Zhou |

(Continued)

OTHER PUBLICATIONS

Partial European Search Report for Application No. EP19165991.1, dated Oct. 16, 2019, 14 pages.

(Continued)

*Primary Examiner* — Eric Myers
(74) *Attorney, Agent, or Firm* — Harrity & Harrity, LLP

(57) ABSTRACT

A device may store first information regarding a first pseudowire connection with a first device, wherein the first pseudowire connection provides access to an Ethernet virtual private network (EVPN) to communicate with a host device. The device may store second information regarding a second pseudowire connection with a second device, wherein the second pseudowire connection provides access to the EVPN to communicate with the host device. The device may receive a message that includes a configuration identifier and identify the configuration identifier. The device may change a first characteristic of the first pseudowire connection based on the configuration identifier. The device may change a second characteristic of the second pseudowire connection based on the configuration identifier. The device may receive data from the host device based on changing the first characteristic of the first pseudowire connection and changing the second characteristic of the second pseudowire connection.

20 Claims, 11 Drawing Sheets

(56) References Cited

U.S. PATENT DOCUMENTS

2017/0141963 A1* 5/2017 Chalapathy ......... H04L 12/4641
2019/0149456 A1* 5/2019 Brissette ................. H04L 45/28
                                                              370/225
2019/0356599 A1* 11/2019 Brissette ............... H04L 45/745

OTHER PUBLICATIONS

Martini et al., "Pseudowire Setup and Maintenance Using the Label Distribution Protocol (LDP)", https://tools.ietf.org/pdf/rfc4447.pdf, Apr. 2006, 34 pages.
Extended European Search Report for Application No. EP19165991. 1, dated Jan. 23, 2020, 12 pages.

* cited by examiner

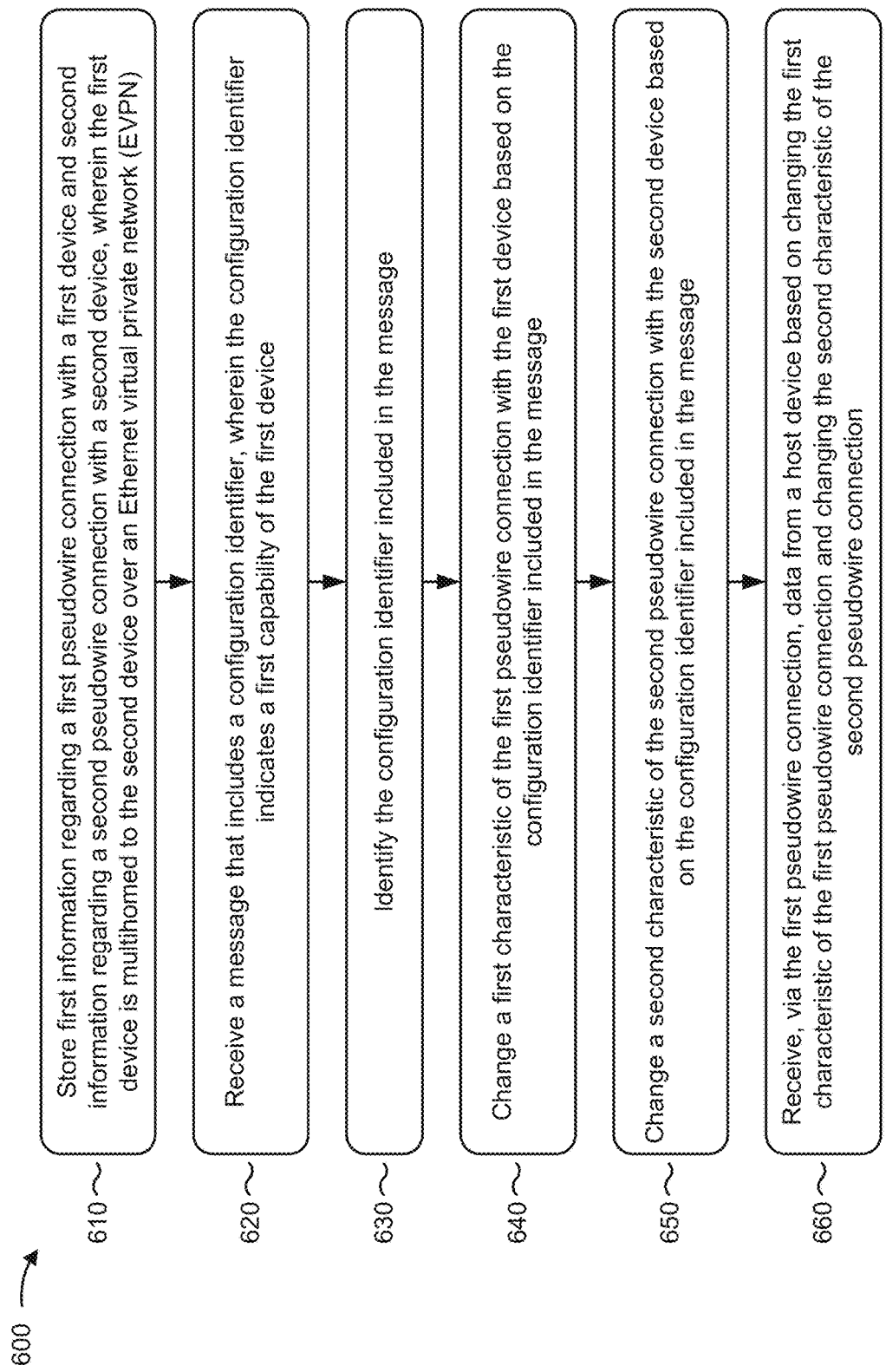

COORDINATING PSEUDOWIRE CONNECTION CHARACTERISTICS AND MULTI-HOMED PROVIDER EDGE DEVICE CAPABILITIES

BACKGROUND

An Ethernet virtual private network (EVPN) enables a group of dispersed customer sites to be connected using a Layer 2 virtual bridge. An EVPN may include customer edge (CE) devices (e.g., routers, switches, or the like) connected to provider edge (PE) devices. In some cases, a CE is multi-homed with two or more PEs on the EVPN.

SUMMARY

According to some implementations, a device may include one or more memories, and one or more processors to store first information regarding a first pseudowire connection with a first device. The first pseudowire connection may provide, via the first device, access to an Ethernet virtual private network (EVPN) to communicate with a host device. The one or more processors may store second information regarding a second pseudowire connection with a second device. The second pseudowire connection provides, via the second device, access to the EVPN to communicate with the host device. The one or more processors may receive a message that includes a configuration identifier. The configuration identifier may indicate that the first device has a designated forwarder capability for the EVPN. The one or more processors may identify the configuration identifier included in the message and change a first characteristic of the first pseudowire connection with the first device based on the configuration identifier included in the message. The one or more processors may change a second characteristic of the second pseudowire connection with the second device based on the configuration identifier included in the message and receive data from the host device based on changing the first characteristic of the first pseudowire connection and changing the second characteristic of the second pseudowire connection.

According to some implementations, a non-transitory computer-readable medium may store instructions that include one or more instructions that, when executed by one or more processors, cause the one or more processors to store first data regarding a first pseudowire connection with a first device. The first pseudowire connection may provide, via the first device, access to an Ethernet virtual private network (EVPN) to communicate with a host device. The one or more instructions may cause the one or more processors to store second data regarding a second pseudowire connection with a second device. The second pseudowire connection may provide access, via the second device, to the EVPN to communicate with the host device. The one or more instructions may cause the one or more processors to determine first information that indicates a first characteristic of the first pseudowire connection and determine second information that indicates a second characteristic of the second pseudowire connection. The one or more instructions may cause the one or more processors to send a first message that includes the first information, to the first device, via the first pseudowire connection. The first message may cause the first device to change a first capability of the first device. The one or more instructions may cause the one or more processors to send a second message that includes the second information, to the second device, via the second pseudowire connection. The second message may cause the second device to change a second capability of the second device. The one or more instructions may cause the one or more processors to receive data from the host device via the first pseudowire connection or the second pseudowire connection after sending the first message and sending the second message.

According to some implementations, a method may include storing, by a device, first information regarding a first pseudowire connection with a first device and second information regarding a second pseudowire connection with a second device. The first device may be multihomed to the second device over an Ethernet virtual private network (EVPN). The method may include receiving, by the device, a message that includes a configuration identifier. The configuration identifier may indicate a first capability of the first device. The method may include identifying, by the device, the configuration identifier included in the message. The method may include changing, by the device, a first characteristic of the first pseudowire connection with the first device based on the configuration identifier included in the message. The method may include changing, by the device, a second characteristic of the second pseudowire connection with the second device based on the configuration identifier included in the message. The method may include receiving, by the device and via the first pseudowire connection, data from a host device based on changing the first characteristic of the first pseudowire connection and changing the second characteristic of the second pseudowire connection.

BRIEF DESCRIPTION OF THE DRAWINGS

FIG. 6 is a flow chart of an example process for coordinating pseudowire connection characteristics and multi-homed provider edge device capabilities.

DETAILED DESCRIPTION

Figure 1A:
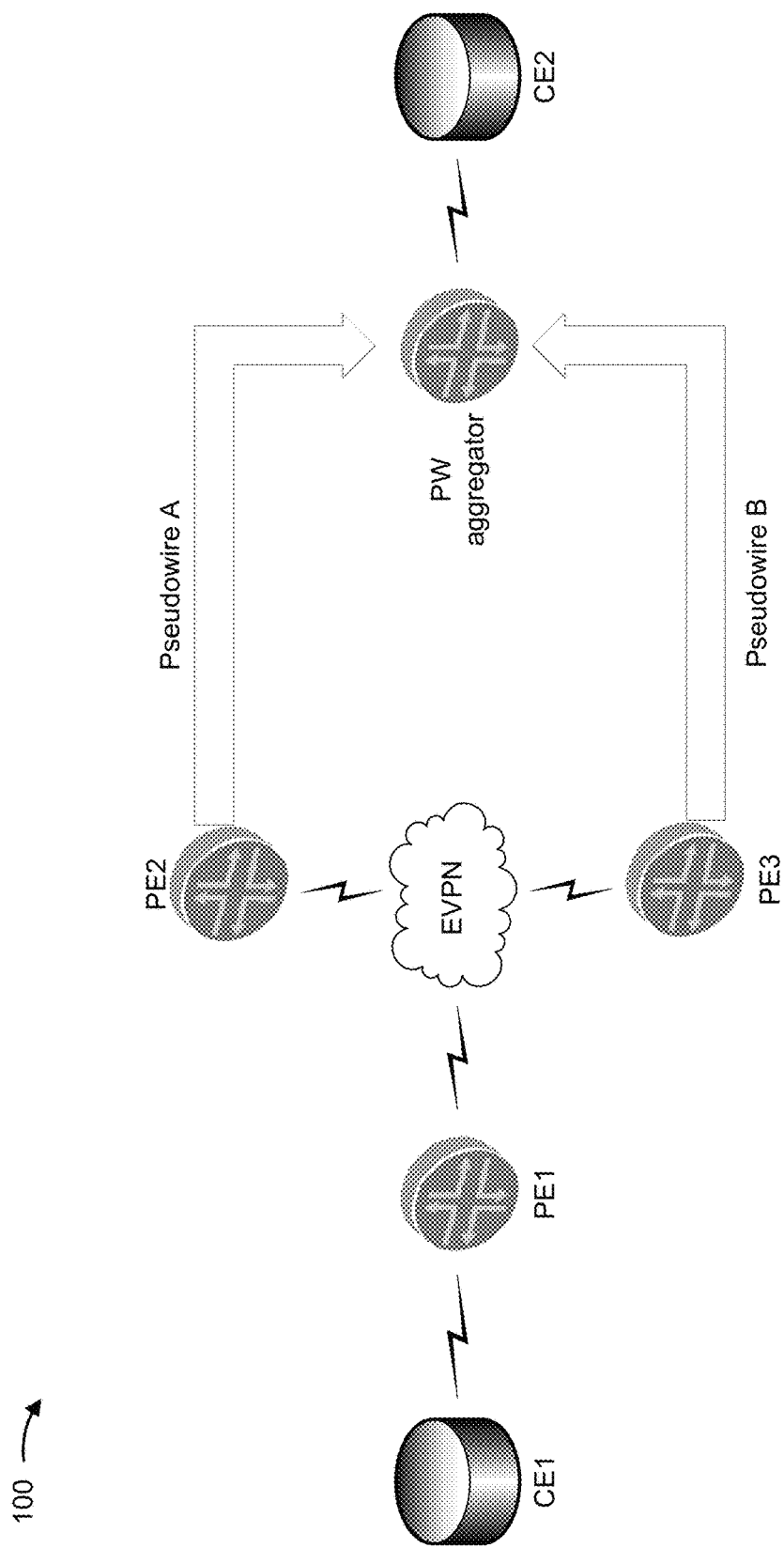
FIGS. 1A-1F are diagrams of example implementations described herein.

The following detailed description of example implementations refers to the accompanying drawings. The same reference numbers in different drawings may identify the same or similar elements.

An Ethernet virtual private network (EVPN) enables a group of dispersed customer sites to be connected using a Layer 2 virtual bridge. An EVPN may include customer edge (CE) devices (e.g., hosts, routers, switches, or the like) connected to provider edge (PE) devices (e.g., any network device with routing functions, such as a router). There may be instances where a source CE is multi-homed (e.g., dual-homed) to two or more PEs that are on or connected to the EVPN, in order to provide redundant connectivity for the source CE. In such instances, one PE may act as a designated forwarder (DF) that forwards network traffic from the source CE and the remainder of the multi-homed PEs may act as non-designated forwarders (NDFs) that serve as backup devices that may forward the network traffic from the source CE if the DF were to fail. The multi-homed PEs prevent forwarding of duplicate data from the source CE because only the DF (and not the NDFs) forwards network traffic from the source CE. In additional instances, a destination CE may be connected to the two or more PEs via two or more pseudowire connections to provide redundant connectivity for the destination CE. In such instances, one pseudowire connection acts as a primary pseudowire connection that transmits the network traffic from the two or more PEs to the destination CE and the remainder of the pseudowire connections act as backup pseudowire connections that transmit the network traffic from the two or more PEs to the destination CE if the primary pseudowire connection were to fail. The two or more PEs may be configured to forward network traffic on only the primary pseudowire connection, thereby preventing transmission of duplicate traffic to the destination CE.

However, issues arise when the capabilities of the multi-homed PEs are not coordinated with the characteristics of the pseudowire connections. For example, one PE may act as a DF, but may be connected to a backup pseudowire connection. In this case, the PE may be configured, as the DF, to forward network traffic from the source CE, but because the PE is configured to only forward the network traffic on a primary pseudowire connection, the PE does not forward the network traffic on the backup pseudowire connection. As another example, one PE may act as an NDF, but may be connected to a primary pseudowire connection. The PE may be configured to forward the network traffic on the primary pseudowire connection, but because the PE may be configured as the NDF to prevent forwarding of the network traffic, the PE does not forward the network traffic on the primary pseudowire connection. In both examples, the PE never forwards the network traffic, which may never arrive at the destination CE.

Some implementations, described herein, provide a pseudowire aggregator (PW aggregator) device that is capable of changing characteristics of the pseudowire connections (e.g., changing a backup pseudowire connection to a primary pseudowire connection, or vice versa), such that the characteristics of the pseudowire connections are coordinated with the capabilities of the PEs. In some implementations, described herein, the PW aggregator may be capable of sending messages to the PEs, such that the messages cause the PEs to change capabilities of the PEs (e.g., change a PE with an NDF capability to a PE with a DF capability, or vice versa), such that the capabilities of the PEs are coordinated with the characteristics of the pseudowire connections.

In this way, some implementations described herein may improve network traffic transmission reliability by ensuring that network traffic from the source CE is delivered to the destination CE using the pseudowire connections and the PEs multi-homed on the network. Moreover, some implementations described herein may conserve processor and/or memory resources of the devices described herein by reducing the amount of time associated with processing and transmitting duplicate network traffic. Further, some implementations may allow the devices described herein to handle more network traffic, which would allow network operators to reduce operating costs by avoiding having to install and maintain additional devices.

FIGS. 1A-1F are diagrams of example implementations 100 described herein. Implementations 100 may include multiple customer edge devices (e.g., shown as customer edge devices CE1 and CE2), multiple provider edge devices (e.g., shown as provider edge devices PE1 through PE3), and a pseudowire aggregator (PW aggregator) device.

As shown in FIG. 1A, in some implementations, customer edge device CE1 may be connected to provider edge device PE1, which is multi-homed with provider edge devices PE2 and PE3 over a network, such as an EVPN core; provider edge devices PE2 and PE3 may be connected to the PW aggregator via separate pseudowire connections (e.g., shown as pseudowire connections Pseudowire A and Pseudowire B); and the PW aggregator may be connected to customer edge device CE2. In some implementations, the EVPN core may be configured in single-active mode (e.g., only a single provider edge device of a plurality of provider edge devices attached to a particular Ethernet-Segment may forward traffic to and from that Ethernet Segment) or all-active mode (e.g., each of the provider edge devices of a plurality of provider edge devices attached to a particular Ethernet-Segment may forward traffic to and from the Ethernet Segment).

In some implementations, the PW aggregator may store information (e.g., first information, first data, and/or the like) regarding pseudowire connection Pseudowire A (e.g., a first pseudowire connection) with provider edge device PE2 (e.g., a first device), where pseudowire connection Pseudowire A provides, via provider edge device PE2, access to the network to communicate with customer edge device CE1 (e.g., a host device). Similarly, the PW aggregator may store information (e.g., second information, second data, and/or the like) regarding pseudowire connection Pseudowire B (e.g., a second pseudowire connection) with provider edge device PE3 (e.g., a second device), where pseudowire connection Pseudowire B provides, via provider edge device PE3, access to the network to communicate with customer edge device CE1 (e.g., the host device). In some implementations, the pseudowire connections Pseudowire A and Pseudowire B may be terminated on the provider edge devices PE2 and PE3, respectively, over a logical interface represented as a pseudowire-subscriber interface (PS interface), such as the ps0 logical interfaces.

For FIGS. 1B-1F, assume that customer edge device CE1 wants to send a packet to customer edge device CE2. The description accompanying FIG. 1B describes a first scenario where the capabilities of the multi-homed provider edge devices PE2 and PE3 are coordinated with the characteristics of the pseudowire connections Pseudowire A and Pseudowire B, such that the packet may be transmitted to customer edge device CE2. The description accompanying FIG. 1C describes a second scenario where the capabilities of the multi-homed provider edge devices PE2 and PE3 are not coordinated with the characteristics of the pseudowire connections Pseudowire A and Pseudowire B, such that the packet may never be transmitted to customer edge device CE2. The description accompanying FIG. 1D describes a third scenario where the PW aggregator causes the characteristics of the pseudowire connections Pseudowire A and Pseudowire B to be coordinated with the capabilities of the multi-homed provider edge devices PE2 and PE3, such that the packet may be transmitted to customer edge device CE2. The description accompanying FIG. 1E describes a fourth scenario where the PW aggregator causes the capabilities of the multi-homed provider edge devices PE2 and PE3 to be coordinated with the characteristics of the pseudowire connections Pseudowire A and Pseudowire B, such that the packet may be transmitted to customer edge device CE2. The description accompanying FIG. 1F describes how the packet may be transmitted to customer edge device CE2 based on the PW aggregator causing the capabilities of the multi-homed provider edge devices PE2 and PE3 to be coordinated with the characteristics of the pseudowire connections Pseudowire A and Pseudowire B in accordance with the fourth scenario.

Figure 1B:
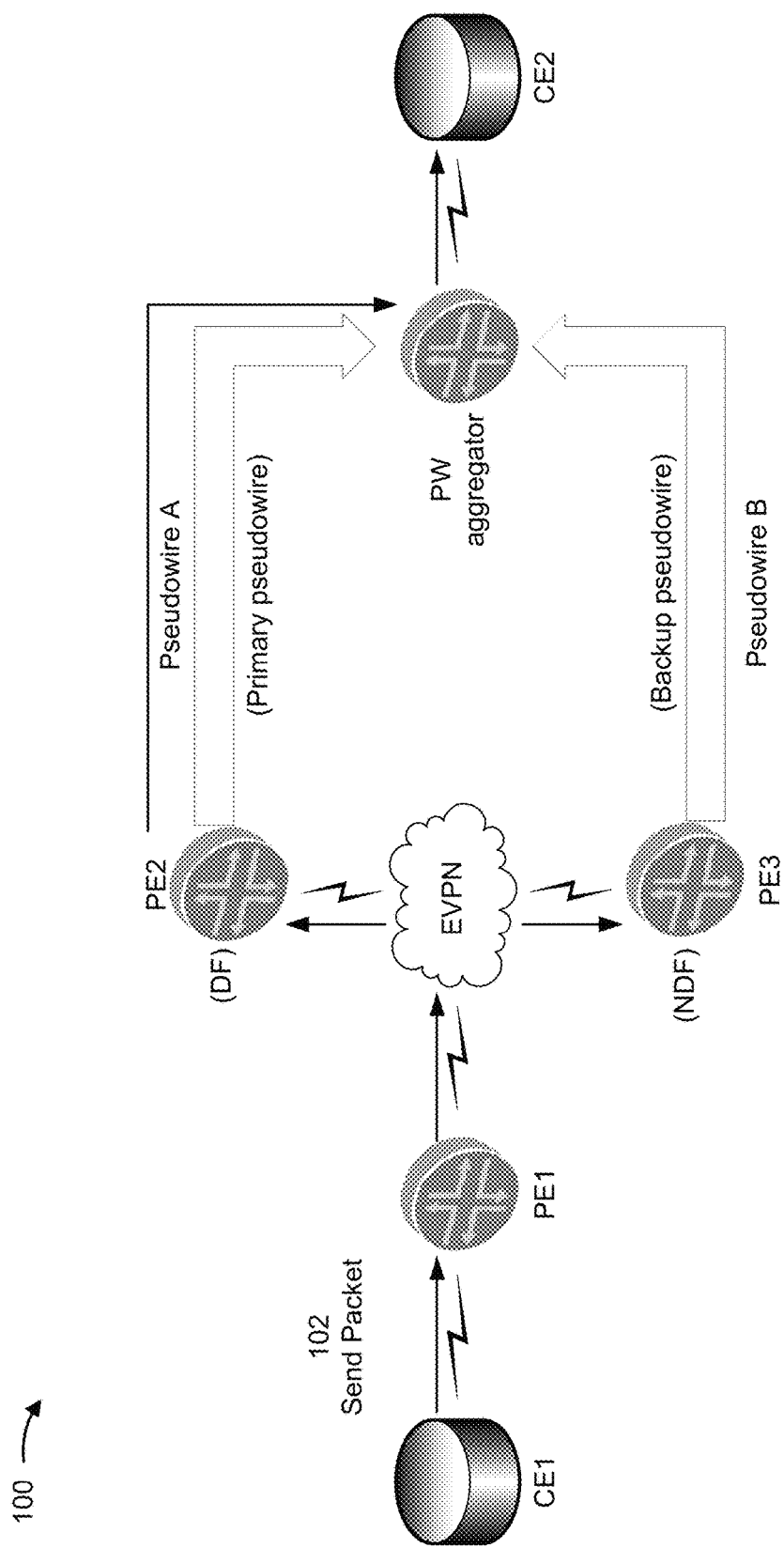

As shown in FIG. 1B, a packet may be transmitted from customer edge device CE1 to customer edge device CE2 where the capabilities of the multi-homed provider edge devices PE2 and PE3 are coordinated with the characteristics of the pseudowire connections Pseudowire A and Pseudowire B. For example, coordination may exist where a provider edge device that has a designated forwarder (DF) capability is connected to a pseudowire connection that is a primary pseudowire connection. Similarly, coordination may exist where a provider edge device that has a non-designated forwarder (NDF) capability is connected to a pseudowire connection that is a backup pseudowire connection. However, coordination may not exist where the provider edge device that has the DF capability is connected to the pseudowire connection that is the backup pseudowire connection or where the provider edge device that has the NDF capability is connected to the pseudowire connection that is the primary pseudowire connection.

As shown by reference number 102, customer edge device CE1 may generate the packet to be sent to customer edge device CE2. For example, the packet may be associated with broadcast, unicast, multicast (BUM) traffic. While some implementations are described in the context of a single packet, in reality, the implementations apply to thousands, millions, or more packets being received by various customer edge devices, provider edge devices, and/or PW aggregator devices.

In some implementations, the packet may be an Address Resolution Protocol (ARP) packet that contains an address resolution request. Customer edge device CE1 may send the ARP packet to determine the media access control address (MAC address) of customer edge device CE2. In some implementations, after receiving the ARP packet from customer edge device CE1, customer edge device CE2 may send an ARP packet that contains an address resolution reply (e.g., customer edge device CE2's MAC address) to customer edge device CE1.

As further shown in FIG. 1B, customer edge device CE1 may send the packet to provider edge device PE1. Because provider edge device PE1 is multi-homed with provider edge devices PE2 and PE3, provider edge device PE1 may forward the packet onto the network and the packet may be transmitted to provider edge devices PE2 and PE3. In this case, provider edge device PE2 may be assigned the DF capability and pseudowire connection Pseudowire A may be the primary pseudowire connection between the PW aggregator and provider edge devices PE2 and PE3. Because the capability of provider edge device PE2 is coordinated with the characteristic of pseudowire connection Pseudowire A, provider edge device PE2 may forward the packet to the pseudowire connection Pseudowire A, which may transmit the packet to the PW aggregator. Additionally, in this case, provider edge device PE3 may be assigned the NDF capability and pseudowire connection Pseudowire B may be the backup pseudowire connection between the PW aggregator and provider edge devices PE2 and PE3. Provider edge device PE3 therefore may prevent the packet from being forwarded by provider edge device PE3 because the provider edge device PE3 has the NDF capability and the provider edge device PE3 is connected to backup pseudowire connection Pseudowire B. As further shown in FIG. 1B, the PW aggregator may send, based on receiving the packet from provider edge device PE2 via pseudowire connection Pseudowire A, the packet to the customer edge device CE2.

Figure 1C:
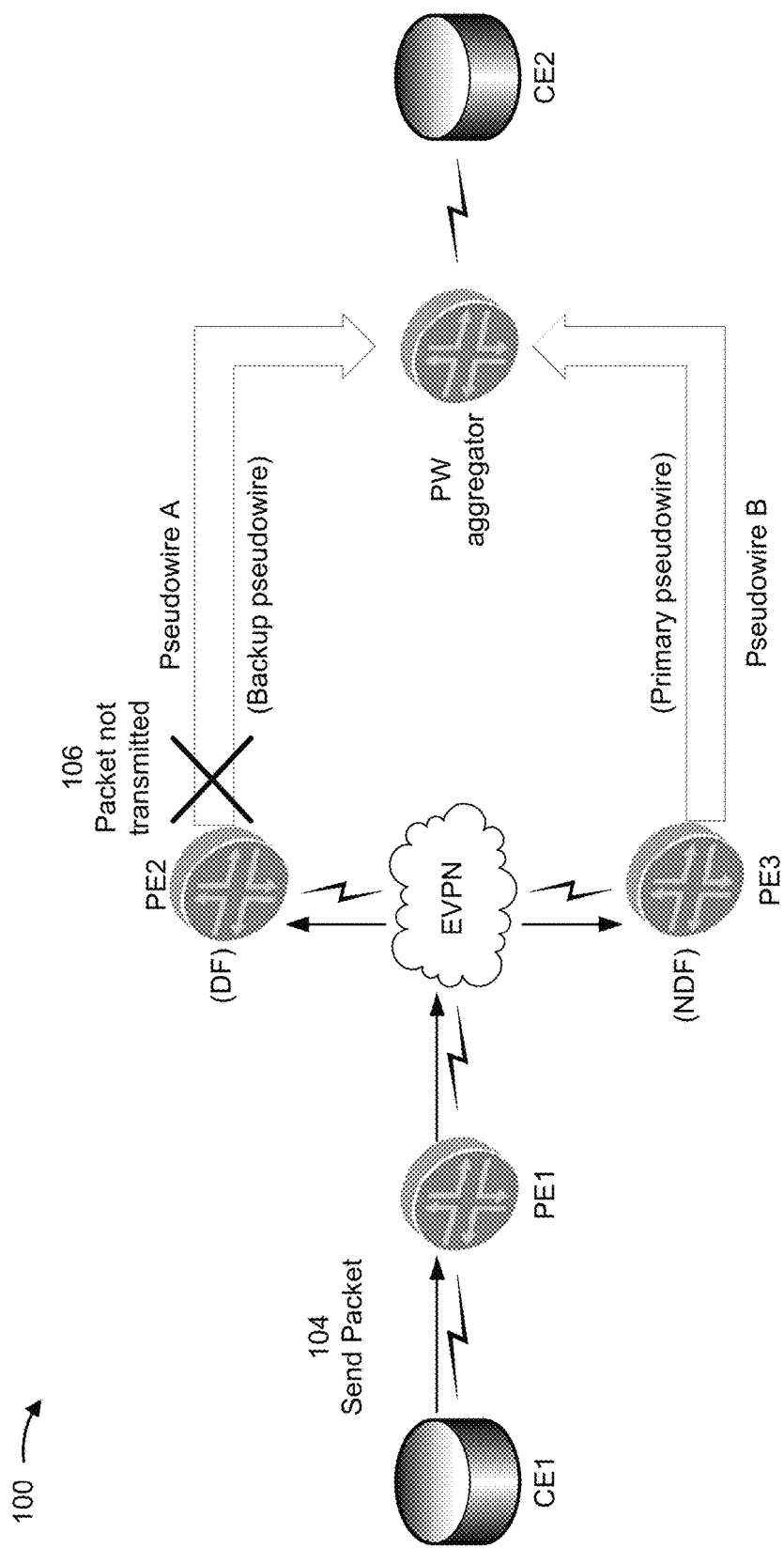

As shown in FIG. 1C, a packet may fail to be transmitted from customer edge device CE1 to customer edge device CE2 because the capabilities of the multi-homed provider edge devices PE2 and PE3 are not coordinated with the characteristics of the pseudowire connections Pseudowire A and Pseudowire B. As shown by reference number 104, customer edge device CE1 may send a packet that is destined for customer edge device CE2 in a similar manner as that described herein (e.g., see the description accompanying FIG. 1B).

As shown by reference number 106, provider edge device PE2 may be assigned the DF capability and therefore may be configured to forward the packet to the PW aggregator via the pseudowire connection Pseudowire A. However, pseudowire connection Pseudowire A may be the backup pseudowire connection between the PW aggregator and provider edge devices PE2 and PE3, so provider edge device PE2, which may be configured to forward the packet on only a primary pseudowire connection, may not forward the packet on pseudowire connection Pseudowire A to the PW aggregator. Similarly, provider edge device PE3 may be assigned the NDF capability and therefore may be configured to prevent forwarding of the packet even though provider edge device PE2 is connected to pseudowire connection Pseudowire B, which may be the primary pseudowire connection, and provider edge device PE2 may be configured to forward the packet on a primary pseudowire connection. In cases such as this, the capabilities of the multi-homed provider edge devices PE2 and PE3 are not coordinated with the characteristics of the pseudowire connections Pseudowire A and Pseudowire B, so the multi-homed provider edge devices may never forward the packet to the PW aggregator and therefore the packet may never arrive at the customer edge device CE2.

Figure 1D:
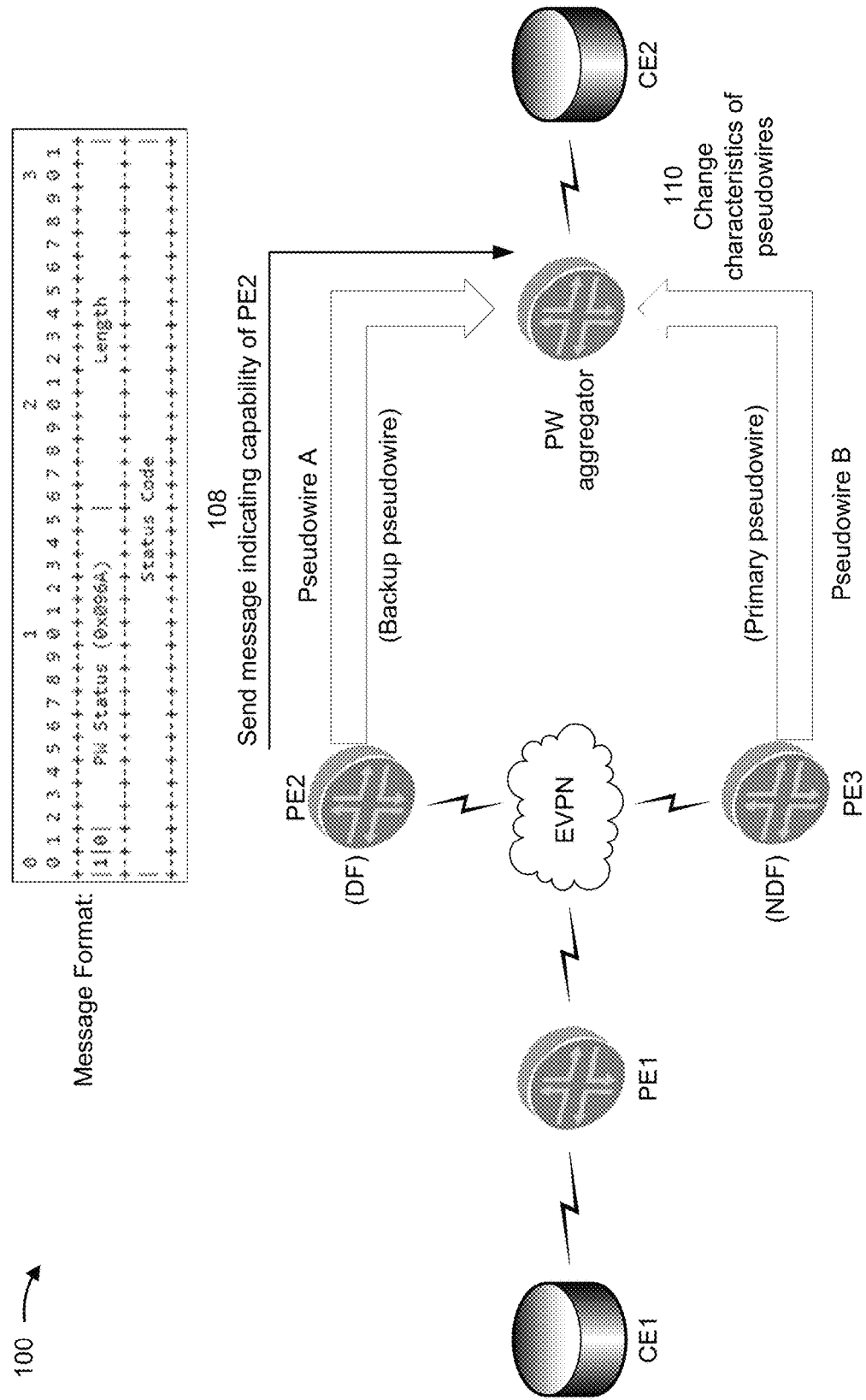

As shown in FIG. 1D, the provider edge device that has the DF capability may send a message to the PW aggregator to ensure the characteristics of the pseudowire connections Pseudowire A and Pseudowire B are coordinated with the capabilities of the multi-homed provider edge devices PE2 and PE3. In some implementations, the provider edge device that has the DF capability may send the message at a scheduled time (e.g., at a particular time interval, such as every 10 seconds), upon a change in the capability of the provider edge device (e.g., the provider edge device changes from a provider edge device with an NDF capability to a provider edge device with a DF capability), upon receiving a packet addressed to a particular customer edge device (e.g., the provider edge device receives a packet to be transmitted to a customer edge device via a pseudowire connection), and/or the like. In some implementations, the provider edge device that has the DF capability may send the message to the PW aggregator to ensure the characteristics of the pseudowire connections Pseudowire A and Pseudowire B are coordinated with the capabilities of the multi-homed provider edge devices PE2 and PE3 so that one or more packets may be sent from customer edge device CE1 to customer edge device CE2.

As shown by reference number 108, provider edge device PE2 has the DF capability and may generate a message that includes a configuration identifier that indicates the capability of provider edge device PE2. For example, provider edge device PE2 may generate a message that includes the configuration identifier, which indicates that provider edge device PE2 has the DF capability for the network. In some implementations, the message may be a type-length-value (TLV) message. In some implementations, as shown in FIG. 1D, the TLV message may include a field that indicates the status of a pseudowire connection (e.g., a "PW Status" field), a field that provides additional status information (e.g., a "Status Code" field), and/or a field indicating the size of the additional status information (e.g., a "Length" field). For example, the message may be a TLV message that includes a 4-octet bit Status Code field, where the configuration identifier is represented by one or more bits in the Status Code field. In some implementations, the TLV message may include the configuration identifier and/or information regarding pseudowire connection Pseudowire A, such as the status of pseudowire connection Pseudowire A, a characteristic of pseudowire connection Pseudowire A (e.g., whether pseudowire connection Pseudowire A is the primary pseudowire connection or the backup pseudowire connection), information concerning Operations, Administration, and Maintenance (OAM) of pseudowire connection Pseudowire A, and/or the like. In some implementations, provider edge device PE2 may send the message to the PW aggregator. For example, provider edge device PE2 may send the message to the PW aggregator via pseudowire connection Pseudowire A. In some implementations, provider edge device PE2 may send the message to the PW aggregator via a pseudowire connection, regardless of whether the pseudowire connection is a primary pseudowire connection or a backup pseudowire connection. For example, provider edge device PE2 may send the message to the PW aggregator via pseudowire connection Pseudowire A, which may be the backup pseudowire connection, as shown in FIG. 1D.

As shown by reference number 110, the PW aggregator may receive the message from provider edge device PE2. For example, the PW aggregator may receive the message that includes the configuration identifier from provider edge device PE2 via pseudowire connection Pseudowire A. In some implementations, the PW aggregator may detect the type of the message (e.g., a TLV message) and determine, based on the detected type, that the message should be parsed. In some implementations, the PW aggregator may parse the message to determine and/or identify the configuration identifier. In some implementations, the PW aggregator may detect the type of the message (e.g., a TLV message) and determine, based on the detected type, the configuration identifier. For example, the PW aggregator may detect that the message is a TLV message and determine the configuration identifier that indicates that provider edge device PE2 has the DF capability based on reading the Status Code field of the TLV message.

In some implementations, the PW aggregator may change the characteristic (e.g., a first characteristic) of pseudowire connection Pseudowire A and the characteristic (e.g., a second characteristic) of pseudowire connection Pseudowire B based on the configuration identifier included in the message. For example, where the configuration identifier indicates that provider edge device PE2 has the DF capability, the PW aggregator may change the characteristic of pseudowire connection Pseudowire A from indicating that pseudowire connection Pseudowire A is the backup pseudowire connection to indicating that pseudowire connection Pseudowire A is the primary pseudowire connection. Accordingly, the PW aggregator may change the characteristic of pseudowire connection Pseudowire B from indicating that pseudowire connection Pseudowire B is the primary pseudowire connection to indicating that pseudowire connection Pseudowire B is the backup pseudowire connection.

Based on changing the characteristic of pseudowire connection Pseudowire A and changing the characteristic of pseudowire connection Pseudowire B, the PW aggregator may receive the one or more packets sent from customer edge device CE1, forwarded by provider edge device PE1, and forwarded by provider edge device PE2 via pseudowire connection Pseudowire A.

Additionally, or alternatively, in some implementations, the provider edge device that has the NDF capability may send an additional message to the PW aggregator, in a similar manner as described elsewhere herein with regard to the provider edge device that has the DF capability, to ensure the characteristics of the pseudowire connections Pseudowire A and Pseudowire B are coordinated with the capabilities of the multi-homed provider edge devices PE2 and PE3. For example, provider edge device PE3, which has the NDF capability, may send the additional message to the PW aggregator via pseudowire connection Pseudowire B, which is the primary pseudowire connection. The additional message sent by the provider edge device that has the NDF capability may include similar information and may be formatted in a similar manner, as described elsewhere herein, as the message sent by the provider edge device that has the DF capability. For example, the provider edge device PE3 may generate a message that is a TLV message that includes a configuration identifier that indicates the capability of provider edge device PE3. The PW aggregator may receive the additional message sent by the provider edge device that has the NDF capability, may determine and/or identify the configuration identifier that indicates the capability of the provider edge device that has the NDF capability, and may change the characteristic of pseudowire connection Pseudowire A and the characteristic of pseudowire connection Pseudowire B, if necessary, in a similar manner as described elsewhere herein with regard to the message sent by the provider edge device with the DF capability. For example, the PW aggregator may receive the message from provider edge device PE3, which has the NDF capability, may determine and/or identify the configuration identifier that indicates the capability of provider edge device PE3, and, if necessary, may change the characteristic of pseudowire connection Pseudowire A to indicate that pseudowire connection Pseudowire A is the primary pseudowire connection and the characteristic of pseudowire connection Pseudowire B to indicate that pseudowire connection Pseudowire B is the backup pseudowire connection.

In this way, the characteristics of the pseudowire connections Pseudowire A and Pseudowire B are coordinated with the capabilities of the multi-homed provider edge devices PE2 and PE3. After the PW aggregator makes changes to the characteristics of the pseudowire connections, the one or more packets may be successfully transmitted from customer edge device CE1 to customer edge device CE2 in a similar manner as described herein (see, e.g., the description corresponding to FIG. 1B). For example, the PW aggregator may receive the one or more packets sent from customer edge device CE1, forwarded by provider edge device PE1, and sent from provider edge device PE2, which has the DF capability, via pseudowire connection Pseudowire A, which has now been changed to the primary pseudowire connection because of the message indicating that provider edge device PE2 has the DF capability and/or the additional message indicating that provider edge device PE3 has the NDF capability. The PW aggregator may then send the one or more packets to the customer edge device CE2.

In some implementations, the capabilities of the multi-homed provider edge devices may change over time because of changing network dynamics (e.g., a provider edge device goes offline, a new customer edge device is added to the network, a pseudowire connection fails, and/or the like). For example, provider edge device PE2 may have the DF capability for a first period of time and then may have the NDF capability for a second period of time based on changing conditions of the network. Accordingly, provider edge device PE3 may have the NDF capability for the first period of time and may have the DF capability for the second period of time.

In some implementations, in a similar manner as described elsewhere herein, a provider edge device may send a message to the PW aggregator after the provider edge device determines that the provider edge device has the DF capability. For example, provider edge device PE2, which may initially have the DF capability, may send a message to the PW aggregator via pseudowire connection Pseudowire A at the beginning of the first period of time, and provider edge device PE3, which may subsequently have the DF capability, may send a new message to the PW aggregator via pseudowire connection Pseudowire B at the beginning of the second period of time. The message may include the configuration identifier that indicates that provider edge device PE2 has the DF capability for the network and the new message may include a new configuration identifier that indicates that provider edge device PE3 has the DF capability for the network.

In some implementations, the PW aggregator may receive the message and perform similar operations to those described elsewhere herein to change the characteristics of the pseudowire connection Pseudowire A and Pseudowire B. For example, after receiving the message from the provider edge device PE2 via the pseudowire connection Pseudowire A, the PW aggregator may change the characteristics of the pseudowire connections Pseudowire A and Pseudowire B (e.g., to identify Pseudowire A as the primary pseudowire and Pseudowire B as the backup pseudowire) to receive data sent from the customer edge device CE1 via pseudowire connection Pseudowire A. In some implementations, the PW aggregator may receive the new message and perform similar operations to those described herein to change the characteristics of the pseudowire connection Pseudowire A and Pseudowire B. For example, after receiving the new message from the provider edge device PE3 via the pseudowire connection Pseudowire B, the PW aggregator may change the characteristics of the pseudowire connections Pseudowire A and Pseudowire B (e.g., to identify Pseudowire A as the backup pseudowire and Pseudowire B as the primary pseudowire) to receive new data sent from the customer edge device CE1 via pseudowire connection Pseudowire B.

Figure 1E:
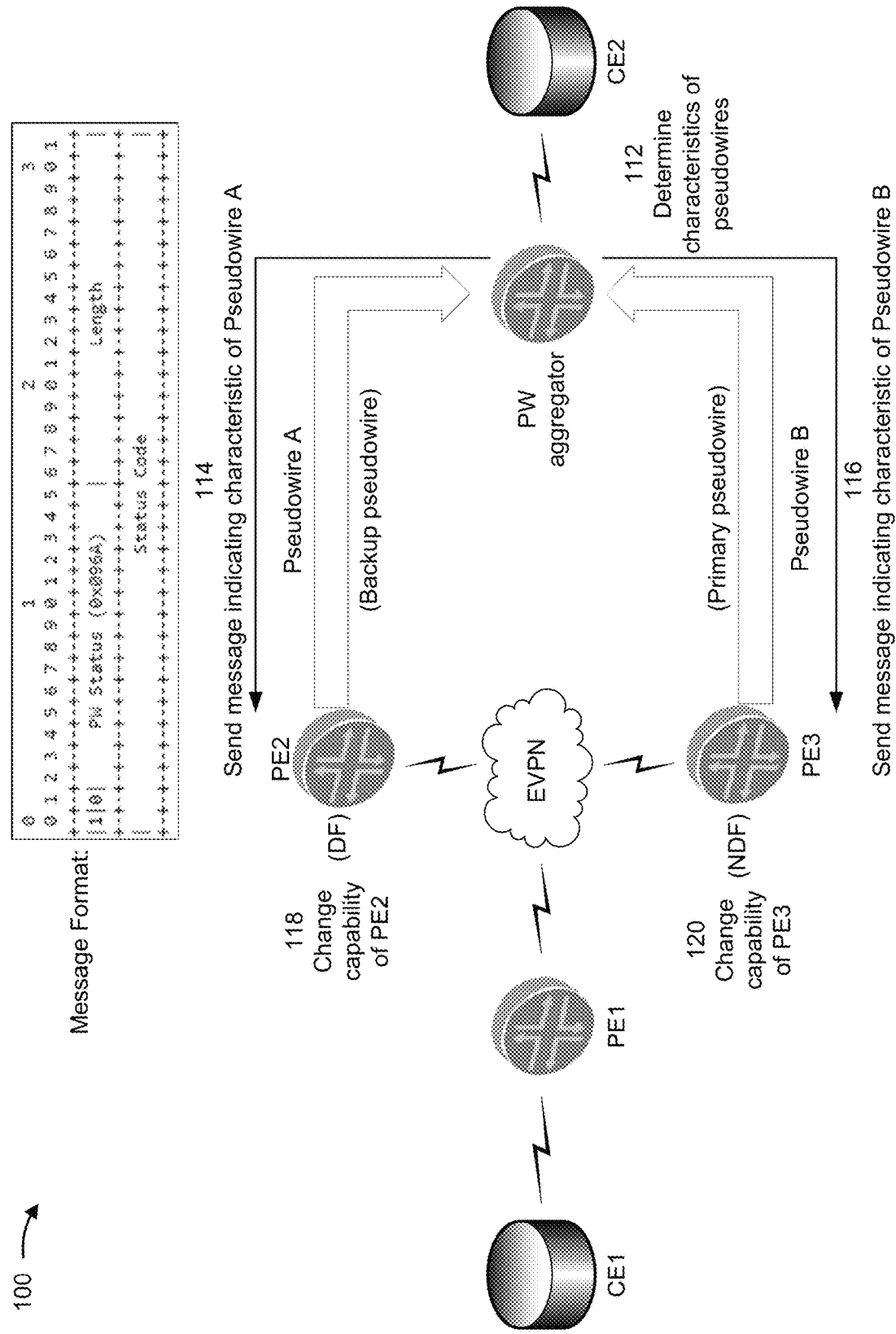

As shown in FIG. 1E, the PW aggregator may send a first message to provider edge device PE2 and/or a second message to provider edge device PE3 to ensure that the capabilities of the multi-homed provider edge devices PE2 and PE3 are coordinated with the characteristics of the pseudowire connections Pseudowire A and Pseudowire B. In some implementations, the PW aggregator may send the first message and/or the second message at a scheduled time (e.g., a regular time interval, such as every 10 seconds), upon a change in the characteristic of the pseudowire connection Pseudowire A and/or a change in the characteristic of the pseudowire connection Pseudowire B (e.g., pseudowire connection Pseudowire A changes from a backup pseudowire connection to a primary pseudowire connection, pseudowire connection Pseudowire B changes from a primary pseudowire connection to a backup pseudowire connection, and/or the like), upon receiving a packet addressed to a particular customer edge device (e.g., the PW aggregator receives a packet to be transmitted to a customer edge device via a pseudowire connection), and/or the like. In some implementations, the PW aggregator may send a first message to provider edge device PE2 and/or a second message to provider edge device PE3 to ensure that the capabilities of the multi-homed provider edge devices PE2 and PE3 are coordinated with the characteristics of the pseudowire connections Pseudowire A and Pseudowire B so that one or more packets may be sent from customer edge device CE1 to customer edge device CE2.

As shown by reference number 112, the PW aggregator may determine information that indicates a characteristic of pseudowire connection Pseudowire A (e.g., whether pseudowire connection Pseudowire A is the primary pseudowire connection or the backup pseudowire connection). In some implementations, the PW aggregator may determine the information that indicates the characteristic of pseudowire connection Pseudowire A based on the information regarding pseudowire connection Pseudowire A stored by the PW aggregator. Similarly, the PW aggregator may determine information that indicates a characteristic of pseudowire connection Pseudowire B (e.g., whether pseudowire connection Pseudowire B is the primary pseudowire connection or the backup pseudowire connection). In some implementations, the PW aggregator may determine the information that indicates the characteristic of pseudowire connection Pseudowire B based on the information regarding pseudowire connection Pseudowire B stored by the PW aggregator.

In some implementations, the PW aggregator may generate a first message that includes the information that indicates the characteristic of pseudowire connection Pseudowire A. For example, the PW aggregator may generate the first message that includes the information that indicates that pseudowire connection Pseudowire A is the backup pseudowire connection. Additionally, the PW aggregator may generate a second message that includes the information that indicates the characteristic of pseudowire connection Pseudowire B. For example, the PW aggregator may generate the second message that includes the information that indicates that pseudowire connection Pseudowire B is the primary pseudowire connection.

In some implementations, the first message may be a TLV message. In some implementations, as shown in FIG. 1E, the TLV message may include a field that indicates the status of a pseudowire connection (e.g., a "PW Status" field), a field that provides additional status information (e.g., a "Status Code" field), and/or a field indicating the size of the additional status information (e.g., a "Length" field). For example, as shown in FIG. 1E, the first message may be a TLV message that has a PW Status field that indicates the characteristic of pseudowire connection Pseudowire A. In some implementations, the first message may be a TLV message that includes information regarding pseudowire connection Pseudowire A, such as the status of pseudowire connection Pseudowire A, the characteristic of pseudowire connection Pseudowire A (e.g., whether pseudowire connection Pseudowire A is the primary pseudowire connection or the backup pseudowire connection), information concerning OAM of pseudowire connection Pseudowire A, and/or the like. In some implementations, as shown in FIG. 1E, the second message may be a TLV message that has a PW Status field that indicates the characteristic of pseudowire connection Pseudowire B. In some implementations, the second message may be a TLV message that includes information regarding pseudowire connection Pseudowire B, such as the status of pseudowire connection Pseudowire B, the characteristic of pseudowire connection Pseudowire B (e.g., whether pseudowire connection Pseudowire B is the primary pseudowire connection or the backup pseudowire connection), information concerning OAM of pseudowire connection Pseudowire B, and/or the like.

As shown by reference number 114, the PW aggregator may send the first message to provider edge device PE2. For example, the PW aggregator may send the first message to the provider edge device PE2 via pseudowire connection Pseudowire A. In some implementations, the PW aggregator may send the first message to provider edge device PE2 via pseudowire connection Pseudowire A, regardless of whether pseudowire connection Pseudowire A is the primary pseudowire connection or the backup pseudowire connection. As shown by reference number 116, the PW aggregator may send the second message to provider edge device PE3. For example, the PW aggregator may send the second message to the provider edge device PE3 via pseudowire connection Pseudowire B. In some implementations, the PW aggregator may send the second message to provider edge device PE3 via pseudowire connection Pseudowire B, regardless of whether pseudowire connection Pseudowire B is the primary pseudowire connection or the backup pseudowire connection.

As shown by reference number 118, provider edge device PE2 may receive the first message from the PW aggregator. In some implementations, provider edge device PE2 may receive the first message from the PW aggregator via pseudowire connection Pseudowire A. In some implementations, provider edge device PE2 may parse the first message to determine and/or identify the information that indicates the characteristic of pseudowire connection Pseudowire A. Additionally, provider edge device PE2 may change the capability of the provider edge device PE2 based on the information that indicates the characteristic of pseudowire connection Pseudowire A. For example, the provider edge device PE2 may change the provider edge device PE2 to have an NDF capability from a DF capability based on the information included in the first message that indicates that pseudowire connection Pseudowire A is the backup pseudowire connection.

As shown by reference number 120, provider edge device PE3 may receive the second message from the PW aggregator. In some implementations, provider edge device PE3 may receive the second message from the PW aggregator via pseudowire connection Pseudowire B. In some implementations, provider edge device PE3 may parse the second message to determine and/or identify the information that indicates the characteristic of pseudowire connection Pseudowire B. Additionally, provider edge device PE3 may change the capability of the provider edge device PE3 based on the information that indicates the characteristic of pseudowire connection Pseudowire B. For example, the provider edge device PE3 may change the provider edge device PE3 to have a DF capability from an NDF capability based on the information included in the second message that indicates that pseudowire connection Pseudowire B is the primary pseudowire connection.

In this way, the capabilities of the multi-homed provider edge devices PE2 and PE3 are coordinated with the characteristics of the pseudowire connections Pseudowire A and Pseudowire B. After the capabilities of provider edge devices PE2 and PE3 are changed, the one or more packets may be successfully transmitted from customer edge device CE1 to customer edge device CE2.

In some implementations, the characteristics of the pseudowire connections may change over time because of changing network dynamics (e.g., a provider edge device goes offline, a new customer edge device is added to the network, a pseudowire connection fails, and/or the like). For example, pseudowire connection Pseudowire A may be the backup pseudowire connection for a first period of time and then may be the primary pseudowire connection for a second period of time based on the changing conditions of the network. Accordingly, pseudowire connection B may be the primary pseudowire connection for the first period of time and then may be the backup pseudowire connection for the second period of time.

In some implementations, in a similar manner as described elsewhere herein, the PW aggregator may send the first message to the provider edge device PE1 and the second message to the provider edge device PE2 after the PW aggregator determines that the characteristic of pseudowire connection Pseudowire A has changed and/or the characteristic of pseudowire connection Pseudowire B has changed. For example, the PW aggregator may send the first message to provider edge device PE2, via pseudowire connection Pseudowire A, and may send the second message to provider edge device PE3, via pseudowire connection Pseudowire B, at the beginning of the first period of time. Additionally, the PW aggregator may send a third message to provider edge device PE2, via pseudowire connection Pseudowire A, and may send a fourth message to provider edge device PE3, via pseudowire connection Pseudowire B, at the beginning of the second period of time.

In some implementations, the first message may include the information that indicates the characteristic of pseudowire connection Pseudowire A (e.g., that pseudowire connection Pseudowire A is the backup pseudowire connection) and the second message may include the information that indicates the characteristic of pseudowire connection Pseudowire B (e.g., that pseudowire connection Pseudowire B is the primary pseudowire connection). The third message may include information that indicates a new characteristic of pseudowire connection Pseudowire A (e.g., that pseudowire connection Pseudowire A is the primary pseudowire connection) and the fourth message may include information that indicates a new characteristic of pseudowire connection Pseudowire B (e.g., that pseudowire connection Pseudowire B is the backup pseudowire connection).

In some implementations, provider edge device PE2 may receive the first message and provider edge device PE3 may receive the second message, and each may perform similar steps to those described elsewhere herein to change the capabilities of provider edge devices PE2 and PE3. In some implementations, provider edge device PE2 may receive the third message and provider edge device PE3 may receive the fourth message, and each may perform similar steps to those described elsewhere herein to change the capabilities of provider edge devices PE2 and PE3.

In some implementations, the PW aggregator may receive data on the pseudowire connections based on sending the first message, second message, third message, and fourth message. For example, the PW aggregator may receive data from the customer edge device CE1 via pseudowire connection Pseudowire B after sending the first message and the second message. As another example, the PW aggregator may receive the data from the customer edge device CE1 via pseudowire connection Pseudowire A after sending the third message and the fourth message.

Figure 1F:
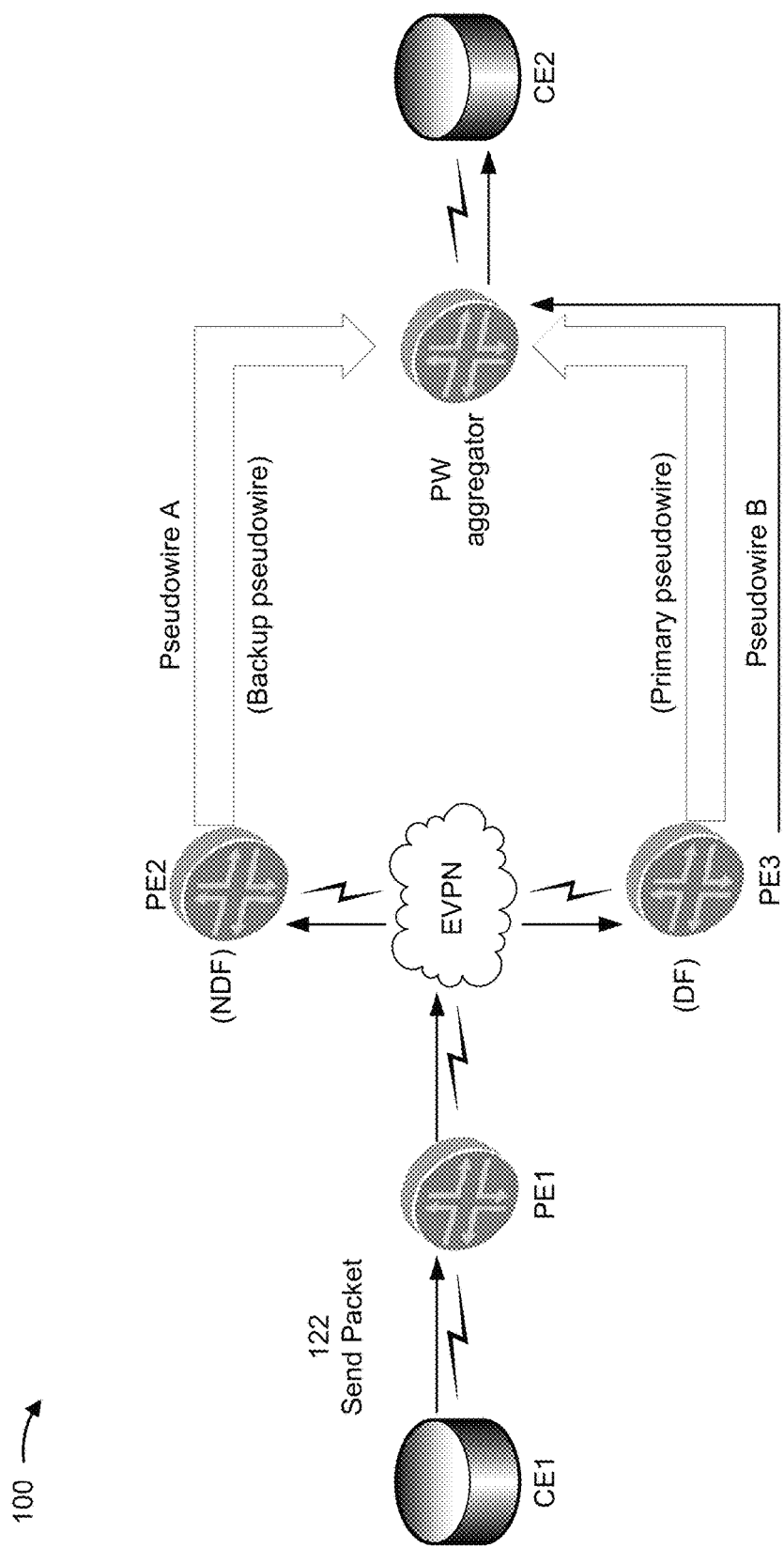

As shown in FIG. 1F, a packet may be transmitted from customer edge device CE1 to customer edge device CE2 after the capabilities of the multi-homed provider edge devices PE2 and PE3 are coordinated with the characteristics of the pseudowire connections Pseudowire A and Pseudowire B (as described herein in relation to FIG. 1E). As shown by reference number 122, customer edge device CE1 may send a packet that is destined for customer edge device CE2 in a similar manner as that described herein (e.g., see the description accompanying FIG. 1B). In this case, the packet may be received by provider edge device PE1 and forwarded to provider edge devices PE2 and PE3.

As shown in FIG. 1E, provider edge device PE2 had the DF capability and provider edge device PE3 had the NDF capability, but the capabilities of provider edge devices PE2 and PE3 were not coordinated with pseudowire connections Pseudowire A (e.g., the backup pseudowire connection) and pseudowire connection Pseudowire B (e.g., the primary pseudowire connection). The PW aggregator sent the first message to provider edge device PE2, which caused provider edge device PE2 to change the provider edge device PE2 to have the NDF capability from the DF capability, and sent the second message to provider edge device PE3, which caused provider edge device PE3 to change the provider edge device PE3 to have the DF capability from the NDF capability.

As shown in FIG. 1F, provider edge devices P2 and P3 may now be coordinated with pseudowire connections Pseudowire A and Pseudowire B. Therefore, the packet may be sent from the provider edge device PE3 and transmitted on pseudowire connection Pseudowire B to the PW aggregator, which may forward the packet to customer edge device CE2. Comparing FIG. 1B and FIG. 1E shows that the packet may be routed from customer edge device CE1 to customer edge device CE2 where the multi-homed provider edge devices are coordinated with the pseudowire connections. FIG. 1B shows that the packet may be routed via provider edge device PE2 and pseudowire connection Pseudowire A to the PW aggregator when provider edge device PE2 has the DF capability and pseudowire connection Pseudowire A is the primary pseudowire connection. Similarly, FIG. 1E shows that the packet may be routed via provider edge device PE3 and pseudowire connection Pseudowire B to the PW aggregator when provider edge device PE3 has the DF capability and pseudowire connection Pseudowire B is the primary pseudowire connection.

Some implementations described herein increase network reliability by ensuring that packets sent from one customer edge device to another customer edge device are not lost due to lack of coordination of provider edge device capabilities with pseudowire connection characteristics. Furthermore, some implementations described herein reduce waste of processing and memory resources of devices in the network by ensuring that packets reach their intended destination and do not need to be resent. In this way, devices in the network are able to handle more packets because the network is more efficient, thus increasing their productivity and minimizing costs of network operators who would otherwise have to install and maintain additional devices on the network.

As indicated above, FIGS. 1A-1F are provided merely as examples. Other examples are possible and may differ from what was described with regard to FIGS. 1A-1F.

Figure 2:
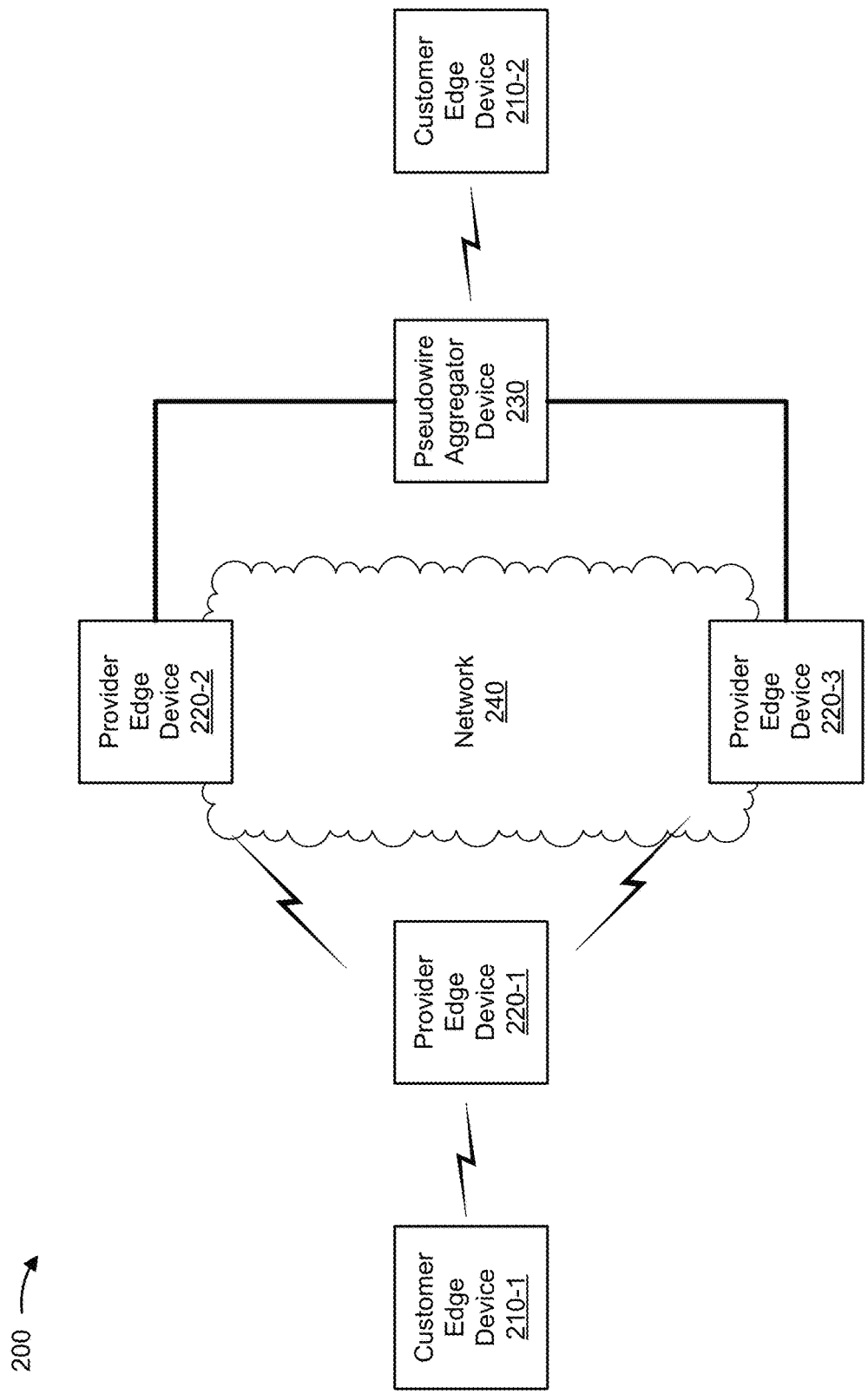
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include customer edge device 210-1 and customer edge device 210-2 (hereinafter referred to collectively as "customer edge devices 210," and individually as "customer edge device 210"); provider edge device 220-1, provider edge device 220-2, and provider edge device 220-3 (hereinafter referred to collectively as "provider edge devices 220," and individually as "provider edge device 220"); a pseudowire aggregator device 230; and a network 240. Devices of environment 200 may interconnect via wired connections, wireless connections, or a combination of wired and wireless connections.

Customer edge device 210 includes one or more devices (e.g., one or more traffic transfer devices) capable of processing and/or transferring traffic. For example, customer edge device 210 may include a firewall, a router, a gateway, a switch, a hub, a bridge, a reverse proxy, a server (e.g., a proxy server), a security device, an intrusion detection device, a load balancer, or a similar type of device. In some implementations, customer edge device 210 may transmit traffic to provider edge device 220 and receive traffic from pseudowire aggregator device 230, as described elsewhere herein. In some implementations, customer edge device 210 may be a physical device implemented within a housing, such as a chassis. In some implementations, customer edge device 210 may be a virtual device implemented by one or more computer devices of a cloud computing environment or a data center.

Provider edge device 220 includes one or more devices (e.g., one or more traffic transfer devices) capable of processing and/or transferring traffic. For example, provider edge device 220 may include a firewall, a router, a gateway, a switch, a hub, a bridge, a reverse proxy, a server (e.g., a proxy server), a security device, an intrusion detection device, a load balancer, or a similar type of device. In some implementations, provider edge device 220 may receive traffic from customer edge device 210 and may transmit the traffic to another provider edge device 220 and/or to pseudowire aggregator device 230, as described elsewhere herein. In some implementations, provider edge device 220 may be a physical device implemented within a housing, such as a chassis. In some implementations, provider edge device 220 may be a virtual device implemented by one or more computer devices of a cloud computing environment or a data center.

Pseudowire aggregator device 230 includes one or more devices (e.g., one or more traffic transfer devices) capable of processing and/or transferring traffic via one or more pseudowire connections. For example, pseudowire aggregator device 230 may include a firewall, a router, a gateway, a switch, a hub, a bridge, a reverse proxy, a server (e.g., a proxy server), a security device, an intrusion detection device, a load balancer, or a similar type of device. In some implementations, pseudowire aggregator device 230 may receive a packet from provider edge device 220 via a pseudowire connection and may send the packet to one or more other customer edge devices, as described elsewhere herein. In some implementations, pseudowire aggregator device 230 may be a physical device implemented within a housing, such as a chassis. In some implementations, pseudowire aggregator device 230 may be a virtual device implemented by one or more computer devices of a cloud computing environment or a data center.

Network 240 includes one or more wired and/or wireless networks. For example, network 240 may include a cellular network (e.g., a long-term evolution (LTE) network, a 3G network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), an Ethernet network, an Ethernet virtual private network (EVPN), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
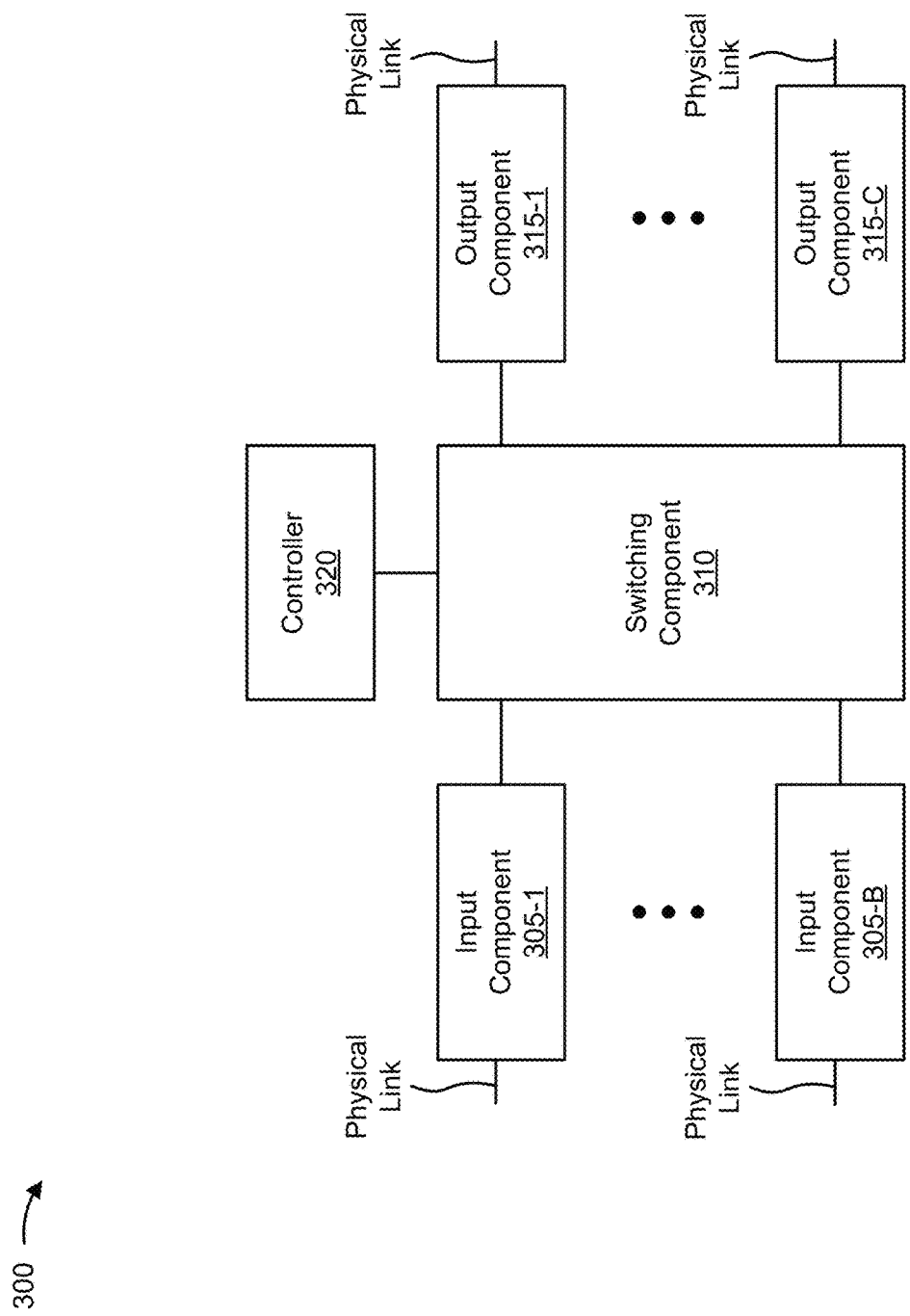
FIG. 3 is a diagram of example components of one or more devices of FIG. 2.

FIG. 3 is a diagram of example components of a device 300. Device 300 may correspond to customer edge device 210, provider edge device 220, and/or pseudowire aggregator device 230. In some implementations, customer edge device 210, provider edge device 220, and/or pseudowire aggregator device 230 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
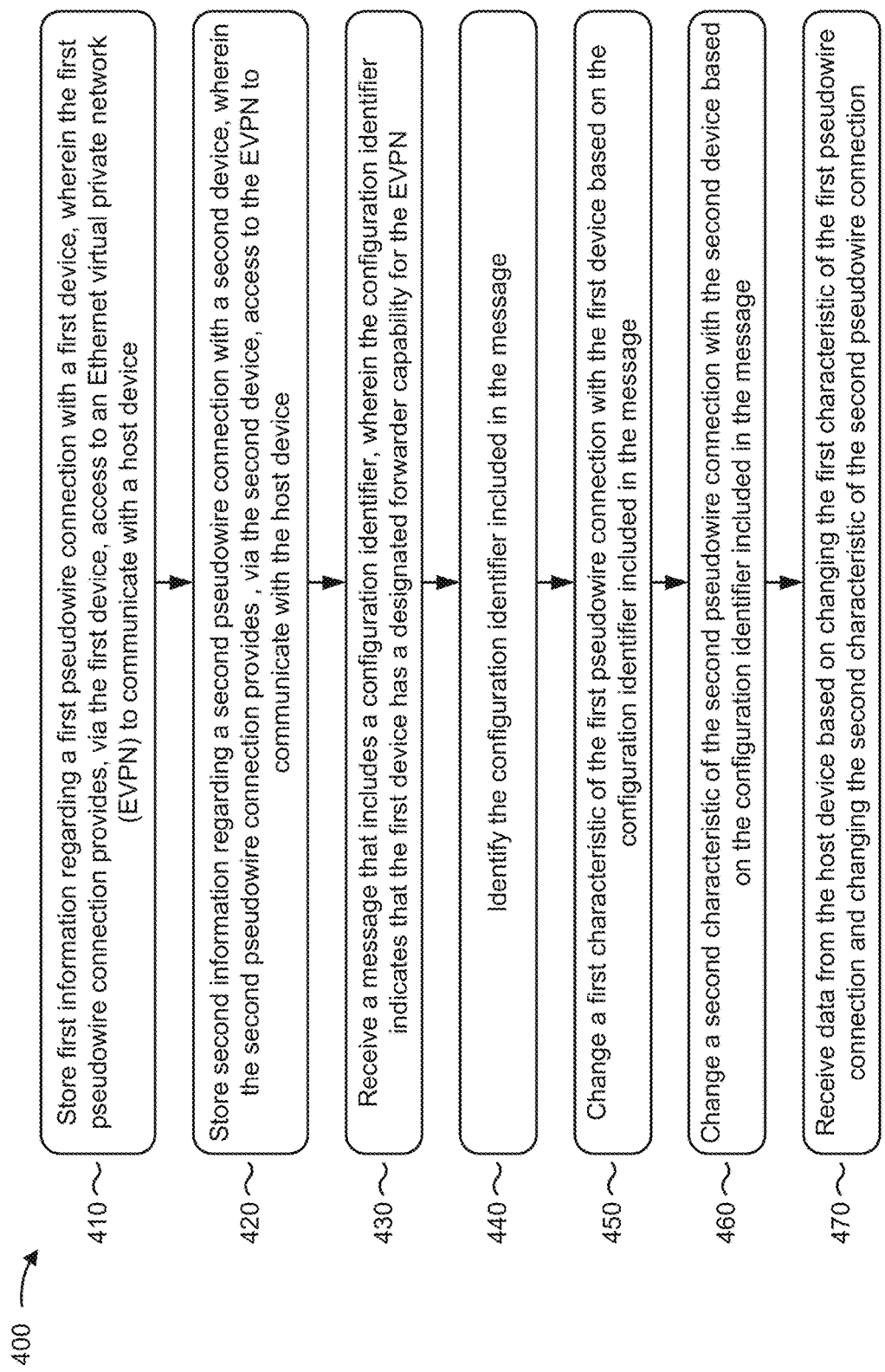
FIG. 4 is a flow chart of an example process for coordinating pseudowire connection characteristics and multi-homed provider edge device capabilities.

FIG. 4 is a flow chart of an example process 400 for coordinating pseudowire connection characteristics and multi-homed provider edge device capabilities. In some implementations, one or more process blocks of FIG. 4 may be performed by a pseudowire aggregator device (e.g., pseudowire aggregator device 230). In some implementations, one or more process blocks of FIG. 4 may be performed by another device or a group of devices separate from or including the pseudowire aggregator device (e.g., pseudowire aggregator device 230), such as a customer edge device (e.g., customer edge device 210) and a provider edge device (e.g., provider edge device 220).

As shown in FIG. 4, process 400 may include storing first information regarding a first pseudowire connection with a first device, wherein the first pseudowire connection provides, via the first device, access to an Ethernet virtual private network (EVPN) to communicate with a host device (block 410). For example, the pseudowire aggregator device (e.g., using input component 305, switching component 310, output component 315, controller 320, and/or the like) may store first information regarding a first pseudowire connection with a first device, as described above in connection with FIGS. 1A-1F. In some implementations, the first pseudowire connection may provide, via the first device, access to an Ethernet virtual private network (EVPN) to communicate with a host device.

As further shown in FIG. 4, process 400 may include storing second information regarding a second pseudowire connection with a second device, wherein the second pseudowire connection provides, via the second device, access to the EVPN to communicate with the host device (block 420). For example, the pseudowire aggregator device (e.g., using input component 305, switching component 310, output component 315, controller 320, and/or the like) may store second information regarding a second pseudowire connection with a second device, as described above in connection with FIGS. 1A-1F. In some implementations, the second pseudowire connection may provide access, via the second device, to the EVPN to communicate with the host device.

As further shown in FIG. 4, process 400 may include receiving a message that includes a configuration identifier, wherein the configuration identifier indicates that the first device has a designated forwarder capability for the EVPN (block 430). For example, the pseudowire aggregator device (e.g., using input component 305, switching component 310, output component 315, controller 320, and/or the like) may receive a message that includes a configuration identifier, as described above in connection with FIGS. 1A-1F. In some implementations, the configuration identifier may indicate that the first device has a designated forwarder capability for the EVPN.

As further shown in FIG. 4, process 400 may include identifying the configuration identifier included in the message (block 440). For example, the pseudowire aggregator device (e.g., using input component 305, switching component 310, output component 315, controller 320, and/or the like) may identify the configuration identifier included in the message, as described above in connection with FIGS. 1A-1F.

As further shown in FIG. 4, process 400 may include changing a first characteristic of the first pseudowire connection with the first device based on the configuration identifier included in the message (block 450). For example, the pseudowire aggregator device (e.g., using input component 305, switching component 310, output component 315, controller 320, and/or the like) may change a first characteristic of the first pseudowire connection with the first device based on the configuration identifier included in the message, as described above in connection with FIGS. 1A-1F.

As further shown in FIG. 4, process 400 may include changing a second characteristic of the second pseudowire connection with the second device based on the configuration identifier included in the message (block 460). For example, the pseudowire aggregator device (e.g., using input component 305, switching component 310, output component 315, controller 320, and/or the like) may change a second characteristic of the second pseudowire connection with the second device based on the configuration identifier included in the message, as described above in connection with FIGS. 1A-1F.

As further shown in FIG. 4, process 400 may include receiving data from the host device based on changing the first characteristic of the first pseudowire connection and changing the second characteristic of the second pseudowire connection (block 470). For example, the pseudowire aggregator device (e.g., using input component 305, switching component 310, output component 315, controller 320, and/or the like) may receive data from the host device based on changing the first characteristic of the first pseudowire connection and changing the second characteristic of the second pseudowire connection, as described above in connection with FIGS. 1A-1F.

Process 400 may include additional implementations, such as any single implementation or any combination of implementations described below and/or in connection with one or more other processes described elsewhere herein.

In some implementations, the EVPN may be configured in single-active mode. In some implementations, when changing the first characteristic of the first pseudowire connection with the first device based on the configuration identifier included in the message, the pseudowire aggregator device may change the first characteristic of the first pseudowire connection with the first device to indicate that the first pseudowire connection with the first device is a primary pseudowire connection. In some implementations, the message may be a type-length-value (TLV) message. In some implementations, the message may include status information regarding the first pseudowire connection with the first device.

In some implementations, the pseudowire aggregator device may receive a new message that includes a new configuration identifier, where the new configuration identifier indicates that the second device has the designated forwarder capability for the EVPN. Additionally, the pseudowire aggregator device may identify the new configuration identifier included in the message, may change the first characteristic of the first pseudowire connection with the first device based on the new configuration identifier included in the new message, may change the second characteristic of the second pseudowire connection with the second device based on the new configuration identifier included in the new message, and may receive new data from the host device based on changing the first characteristic of the first pseudowire connection and changing the second characteristic of the second pseudowire connection.

In some implementations, the message may be received via the first pseudowire connection with the first device and the new message may be received via the second pseudowire connection with the second device. In some implementations, when receiving the data from the host device, the pseudowire aggregator device may receive the data from the host device via the first pseudowire connection with the first device. Additionally, when receiving the new data from the host device, the pseudowire aggregator device may receive the new data from the host device via the second pseudowire connection with the second device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
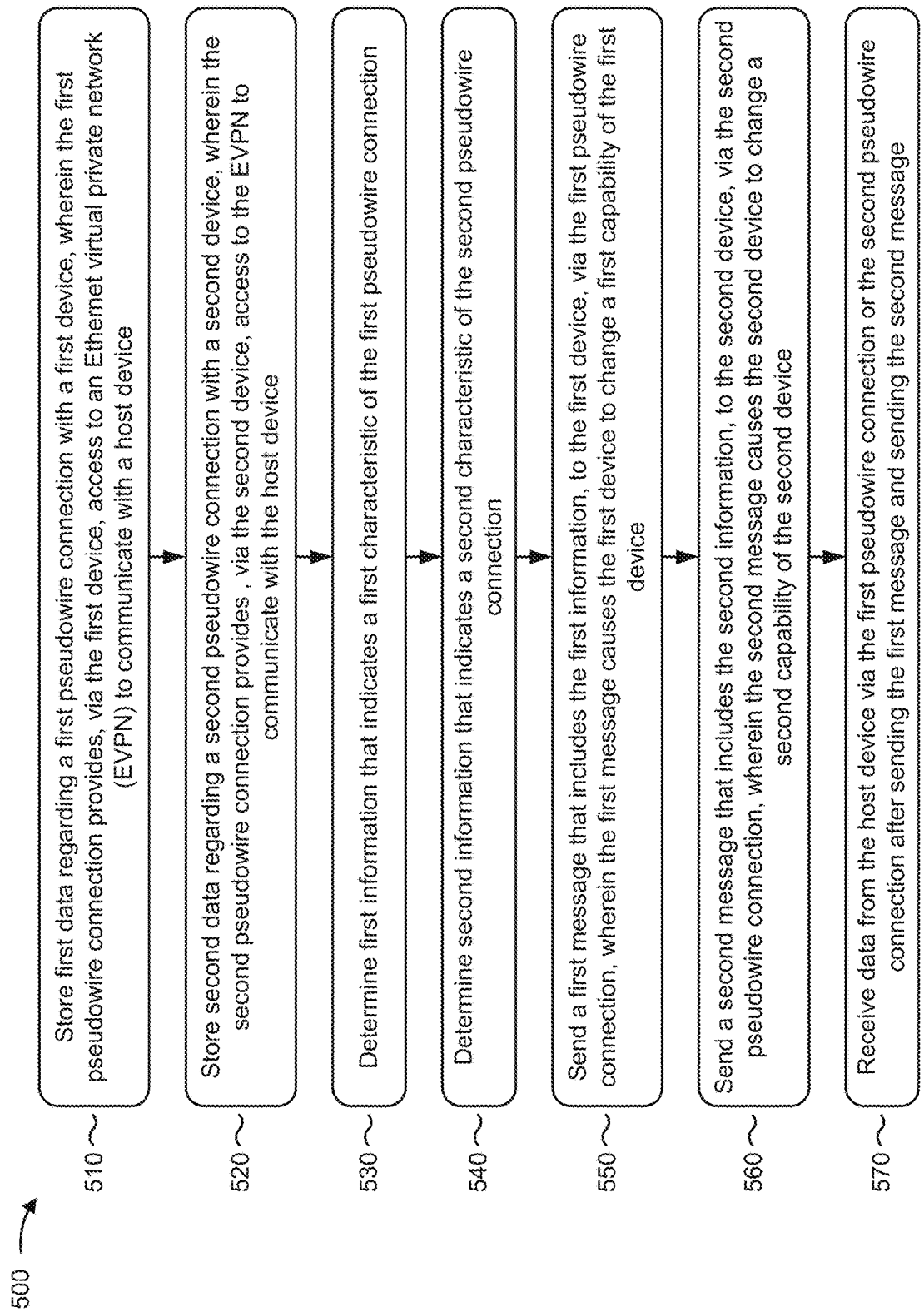
FIG. 5 is a flow chart of an example process for coordinating pseudowire connection characteristics and multi-homed provider edge device capabilities.

FIG. 5 is a flow chart of an example process 500 for coordinating pseudowire connection characteristics and multi-homed provider edge device capabilities. In some implementations, one or more process blocks of FIG. 5 may be performed by a pseudowire aggregator device (e.g., pseudowire aggregator device 230). In some implementations, one or more process blocks of FIG. 5 may be performed by another device or a group of devices separate from or including the pseudowire aggregator device (e.g., pseudowire aggregator device 230), such as a customer edge device (e.g., customer edge device 210) and a provider edge device (e.g., provider edge device 220).

As shown in FIG. 5, process 500 may include storing first data regarding a first pseudowire connection with a first device, wherein the first pseudowire connection provides, via the first device, access to an Ethernet virtual private network (EVPN) to communicate with a host device (block 510). For example, the pseudowire aggregator device (e.g., using input component 305, switching component 310, output component 315, controller 320, and/or the like) may store first data regarding a first pseudowire connection with a first device, as described above in connection with FIGS. 1A-1F. In some implementations, the first pseudowire connection may provide, via the first device, access to an Ethernet virtual private network (EVPN) to communicate with a host device.

As further shown in FIG. 5, process 500 may include storing second data regarding a second pseudowire connection with a second device, wherein the second pseudowire connection provides, via the second device, access to the EVPN to communicate with the host device (block 520). For example, the pseudowire aggregator device (e.g., using input component 305, switching component 310, output component 315, controller 320, and/or the like) may store second data regarding a second pseudowire connection with a second device, as described above in connection with FIGS. 1A-1F. In some implementations, the second pseudowire connection may provide access, via the second device, to the EVPN to communicate with the host device.

As further shown in FIG. 5, process 500 may include determining first information that indicates a first characteristic of the first pseudowire connection (block 530). For example, the pseudowire aggregator device (e.g., using input component 305, switching component 310, output component 315, controller 320, and/or the like) may determine first information that indicates a first characteristic of the first pseudowire connection, as described above in connection with FIGS. 1A-1F.

As further shown in FIG. 5, process 500 may include determining second information that indicates a second characteristic of the second pseudowire connection (block 540). For example, the pseudowire aggregator device (e.g., using input component 305, switching component 310, output component 315, controller 320, and/or the like) may determine second information that indicates a second characteristic of the second pseudowire connection, as described above in connection with FIGS. 1A-1F.

As further shown in FIG. 5, process 500 may include sending a first message that includes the first information, to the first device, via the first pseudowire connection, wherein the first message causes the first device to change a first capability of the first device (block 550). For example, the pseudowire aggregator device (e.g., using input component 305, switching component 310, output component 315, controller 320, and/or the like) may send a first message that includes the first information, to the first device, via the first pseudowire connection, as described above in connection with FIGS. 1A-1F. In some implementations, the first message may cause the first device to change a first capability of the first device.

As further shown in FIG. 5, process 500 may include sending a second message that includes the second information, to the second device, via the second pseudowire connection, wherein the second message causes the second device to change a second capability of the second device (block 560). For example, the pseudowire aggregator device (e.g., using input component 305, switching component 310, output component 315, controller 320, and/or the like) may send a second message that includes the second information, to the second device, via the second pseudowire connection, as described above in connection with FIGS. 1A-1F. In some implementations, the second message may cause the second device to change a second capability of the second device.

As further shown in FIG. 5, process 500 may include receiving data from the host device via the first pseudowire connection or the second pseudowire connection after sending the first message and sending the second message (block 570). For example, the pseudowire aggregator device (e.g., using input component 305, switching component 310, output component 315, controller 320, and/or the like) may receive data from the host device via the first pseudowire connection or the second pseudowire connection after sending the first message and sending the second message, as described above in connection with FIGS. 1A-1F.

Process 500 may include additional implementations, such as any single implementation or any combination of implementations described below and/or in connection with one or more other processes described elsewhere herein.

In some implementations, the first message may be a type-length-value (TLV) message and the second message may be a TLV message. In some implementations, the first information may indicate that the first pseudowire connection is a backup pseudowire connection.

In some implementations, the pseudowire aggregator device may determine third information that indicates a third characteristic of the first pseudowire connection, determine fourth information that indicates a fourth characteristic of the second pseudowire connection, and send a third message that includes the third information, to the first device, via the first pseudowire connection, where the third message causes the first device to change the first capability of the first device. Additionally, the pseudowire aggregator device may send a fourth message that includes the fourth information, to the second device, via the second pseudowire connection, where the fourth message causes the second device to change the second capability of the second device. Additionally, the pseudowire aggregator device may receive new data from the host device after sending the third message and sending the fourth message.

In some implementations, the first information may indicate that the first pseudowire connection is a backup pseudowire connection and the third information may indicate that the first pseudowire connection is a primary pseudowire connection. In some implementations, when receiving the data from the host device and receiving the new data from the host device, the pseudowire aggregator device may receive the data from the host device via the second pseudowire connection with the second device, and may receive the new data from the host device via the first pseudowire connection with the first device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for coordinating pseudowire connection characteristics and multi-homed provider edge device capabilities. In some implementations, one or more process blocks of FIG. 6 may be performed by a pseudowire aggregator device (e.g., pseudowire aggregator device 230). In some implementations, one or more process blocks of FIG. 6 may be performed by another device or a group of devices separate from or including the pseudowire aggregator device (e.g., pseudowire aggregator device 230), such as a customer edge device (e.g., customer edge device 210) and a provider edge device (e.g., provider edge device 220).

As shown in FIG. 6, process 600 may include storing first information regarding a first pseudowire connection with a first device and second information regarding a second pseudowire connection with a second device, wherein the first device is multihomed to the second device over an Ethernet virtual private network (EVPN) (block 610). For example, the pseudowire aggregator device (e.g., using input component 305, switching component 310, output component 315, controller 320, and/or the like) may store first information regarding a first pseudowire connection with a first device and second information regarding a second pseudowire connection with a second device, as described above in connection with FIGS. 1A-1F. In some implementations, the first device may be multihomed to the second device over an Ethernet virtual private network (EVPN).

As further shown in FIG. 6, process 600 may include receiving a message that includes a configuration identifier, wherein the configuration identifier indicates a first capability of the first device (block 620). For example, the pseudowire aggregator device (e.g., using input component 305, switching component 310, output component 315, controller 320, and/or the like) may receive a message that includes a configuration identifier, as described above in connection with FIGS. 1A-1F. In some implementations, the configuration identifier may indicate a first capability of the first device.

As further shown in FIG. 6, process 600 may include identifying the configuration identifier included in the message (block 630). For example, the pseudowire aggregator device (e.g., using input component 305, switching component 310, output component 315, controller 320, and/or the like) may identify the configuration identifier included in the message, as described above in connection with FIGS. 1A-1F.

As further shown in FIG. 6, process 600 may include changing a first characteristic of the first pseudowire connection with the first device based on the configuration identifier included in the message (block 640). For example, the pseudowire aggregator device (e.g., using input component 305, switching component 310, output component 315, controller 320, and/or the like) may change a first characteristic of the first pseudowire connection with the first device based on the configuration identifier included in the message, as described above in connection with FIGS. 1A-1F.

As further shown in FIG. 6, process 600 may include changing a second characteristic of the second pseudowire connection with the second device based on the configuration identifier included in the message (block 650). For example, the pseudowire aggregator device (e.g., using input component 305, switching component 310, output component 315, controller 320, and/or the like) may change a second characteristic of the second pseudowire connection with the second device based on the configuration identifier included in the message, as described above in connection with FIGS. 1A-1F.

As further shown in FIG. 6, process 600 may include receiving, via the first pseudowire connection, data from a host device based on changing the first characteristic of the first pseudowire connection and changing the second characteristic of the second pseudowire connection (block 660). For example, the pseudowire aggregator device (e.g., using input component 305, switching component 310, output component 315, controller 320, and/or the like) may receive, via the first pseudowire connection, data from a host device based on changing the first characteristic of the first pseudowire connection and changing the second characteristic of the second pseudowire connection, as described above in connection with FIGS. 1A-1F.

Process 600 may include additional implementations, such as any single implementation or any combination of implementations described below and/or in connection with one or more other processes described elsewhere herein.

In some implementations, the EVPN may be configured in all-active mode. In some implementations, the configuration identifier may indicate that the first device has a designated forwarder capability for the EVPN. In some implementations, when changing the first characteristic of the first pseudowire connection with the first device based on the configuration identifier included in the message, the pseudowire aggregator device may change the first characteristic of the first pseudowire connection with the first device to indicate that the first pseudowire connection with the first device is a primary pseudowire connection. In some implementations, when changing the second characteristic of the second pseudowire connection with the second device based on the configuration identifier included in the message, the pseudowire aggregator device may change the second characteristic of the second pseudowire connection with the second device to indicate that the second pseudowire connection with the second device is a backup pseudowire connection.

In some implementations, the pseudowire aggregator device may receive a new message that includes a new configuration identifier, where the new configuration identifier indicates a second capability of the second device. Additionally, the pseudowire aggregator device may identify the new configuration identifier included in the new message, may change the first characteristic of the first pseudowire connection with the first device based on the new configuration identifier included in the new message, may change the second characteristic of the second pseudowire connection with the second device based on the new configuration identifier included in the new message and may receive, via the second pseudowire connection, new data from the host device based on changing the first characteristic of the first pseudowire connection and changing the second characteristic of the second pseudowire connection. In some implementations, the configuration identifier may indicate that the first device has a designated forwarder capability for the EVPN and the new configuration identifier may indicate that the second device has the designated forwarder capability for the EVPN.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, pseudowire aggregator device 230 may improve network traffic transmission reliability by ensuring that network traffic from a source CE 210 is delivered to a destination CE 210 using the pseudowire connections and the provider edge devices 220 multi-homed on network 240. Moreover, pseudowire aggregator device 230 may conserve processor and/or memory resources of the devices described herein by reducing the amount of time associated with processing and transmitting duplicate network traffic. Further, pseudowire aggregator device 230 may allow the devices described herein to handle more network traffic, which would help network operators reduce costs by avoiding having to install and maintain additional devices.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors to:
store first information regarding a first pseudowire connection with a first device,
wherein the first pseudowire connection provides, via the first device, access to an Ethernet virtual private network (EVPN) to communicate with a host device;
store second information regarding a second pseudowire connection with a second device,
wherein the second pseudowire connection provides, via the second device, access to the EVPN to communicate with the host device;
receive a message that includes a configuration identifier,
wherein the configuration identifier indicates that the first device has a designated forwarder capability for the EVPN;
identify the configuration identifier included in the message;
change a first characteristic of the first pseudowire connection with the first device based on the configuration identifier included in the message;
change a second characteristic of the second pseudowire connection with the second device based on the configuration identifier included in the message; and
receive data from the host device based on changing the first characteristic of the first pseudowire connection and changing the second characteristic of the second pseudowire connection.

2. The device of claim 1, wherein the EVPN is configured in single-active mode.

3. The device of claim 1, wherein the one or more processors, when changing the first characteristic of the first pseudowire connection with the first device based on the configuration identifier included in the message, are to:
change the first characteristic of the first pseudowire connection with the first device to indicate that the first pseudowire connection with the first device is a primary pseudowire connection.

4. The device of claim 1, wherein the message is a type-length-value (TLV) message,
wherein the message includes status information regarding the first pseudowire connection with the first device.

5. The device of claim 1, wherein the one or more processors are further to:
receive a new message that includes a new configuration identifier,
wherein the new configuration identifier indicates that the second device has the designated forwarder capability for the EVPN;
identify the new configuration identifier included in the message;
change the first characteristic of the first pseudowire connection with the first device based on the new configuration identifier included in the new message;
change the second characteristic of the second pseudowire connection with the second device based on the new configuration identifier included in the new message; and receive new data from the host device based on changing the first characteristic of the first pseudowire connection and changing the second characteristic of the second pseudowire connection.

6. The device of claim 5, wherein the message is received via the first pseudowire connection with the first device and the new message is received via the second pseudowire connection with the second device.

7. The device of claim 5, where the one or more processors, when receiving the data from the host device, are to:
   receive the data from the host device via the first pseudowire connection with the first device; and
   where the one or more processors, when receiving the new data from the host device are to:
      receive the new data from the host device via the second pseudowire connection with the second device.

8. A non-transitory computer-readable medium storing instructions, the instructions comprising:
   one or more instructions that, when executed by one or more processors, cause the one or more processors to:
      store first information regarding a first pseudowire connection with a first device,
         wherein the first pseudowire connection provides, via the first device, access to an Ethernet virtual private network (EVPN) to communicate with a host device;
      store second information regarding a second pseudowire connection with a second device,
         wherein the second pseudowire connection provides, via the second device, access to the EVPN to communicate with the host device;
      receive a message that includes a configuration identifier,
         wherein the configuration identifier indicates that the first device has a designated forwarder capability for the EVPN;
      identify the configuration identifier included in the message;
      change a first characteristic of the first pseudowire connection with the first device based on the configuration identifier included in the message;
      change a second characteristic of the second pseudowire connection with the second device based on the configuration identifier included in the message; and
      receive data from the host device based on changing the first characteristic of the first pseudowire connection and changing the second characteristic of the second pseudowire connection.

9. The non-transitory computer-readable medium of claim 8, wherein the EVPN is configured in single-active mode.

10. The non-transitory computer-readable medium of claim 8, wherein the one or more instructions, when executed by the one or more processors to change the first characteristic of the first pseudowire connection with the first device based on the configuration identifier included in the message, cause the one or more processors to:
   change the first characteristic of the first pseudowire connection with the first device to indicate that the first pseudowire connection with the first device is a primary pseudowire connection.

11. The non-transitory computer-readable medium of claim 8, wherein the message is a type-length-value (TLV) message,
   wherein the message includes status information regarding the first pseudowire connection with the first device.

12. The non-transitory computer-readable medium of claim 8, wherein the one or more instructions, when executed by the one or more processors, further cause the one or more processors to:
   receive a new message that includes a new configuration identifier,
      wherein the new configuration identifier indicates that the second device has the designated forwarder capability for the EVPN;
   identify the new configuration identifier included in the message;
   change the first characteristic of the first pseudowire connection with the first device based on the new configuration identifier included in the new message;
   change the second characteristic of the second pseudowire connection with the second device based on the new configuration identifier included in the new message; and
   receive new data from the host device based on changing the first characteristic of the first pseudowire connection and changing the second characteristic of the second pseudowire connection.

13. The non-transitory computer-readable medium of claim 12, wherein the message is received via the first pseudowire connection with the first device and the new message is received via the second pseudowire connection with the second device.

14. The non-transitory computer-readable medium of claim 12, wherein the one or more instructions, when executed by the one or more processors to receive the data from the host device, cause the one or more processors to:
   receive the data from the host device via the first pseudowire connection with the first device; and
   where the one or more instructions, when executed by the one or more processors to receive the new data from the host device, cause the one or more processors to:
      receive the new data from the host device via the second pseudowire connection with the second device.

15. A method comprising:
   storing, by a device, first information regarding a first pseudowire connection with a first device,
      wherein the first pseudowire connection provides, via the first device, access to an Ethernet virtual private network (EVPN) to communicate with a host device;
   storing, by the device, second information regarding a second pseudowire connection with a second device,
      wherein the second pseudowire connection provides, via the second device, access to the EVPN to communicate with the host device;
   receiving a message that includes a configuration identifier,
      wherein the configuration identifier indicates that the first device has a designated forwarder capability for the EVPN;
   identifying, by the device, the configuration identifier included in the message;
   changing, by the device, a first characteristic of the first pseudowire connection with the first device based on the configuration identifier included in the message;
   changing, by the device, a second characteristic of the second pseudowire connection with the second device based on the configuration identifier included in the message; and receiving, by the device, data from the host device based on changing the first characteristic of the first pseudowire connection and changing the second characteristic of the second pseudowire connection.

16. The method of claim 15, wherein the EVPN is configured in single-active mode.

17. The method of claim 15, wherein changing the first characteristic of the first pseudowire connection with the first device based on the configuration identifier included in the message comprises:
   changing the first characteristic of the first pseudowire connection with the first device to indicate that the first pseudowire connection with the first device is a primary pseudowire connection.

18. The method of claim 15, wherein the message is a type-length-value (TLV) message,
   wherein the message includes status information regarding the first pseudowire connection with the first device.

19. The method of claim 15, further comprising:
   receiving a new message that includes a new configuration identifier,
   wherein the new configuration identifier indicates that the second device has the designated forwarder capability for the EVPN;
   identifying the new configuration identifier included in the message;
   changing the first characteristic of the first pseudowire connection with the first device based on the new configuration identifier included in the new message;
   changing the second characteristic of the second pseudowire connection with the second device based on the new configuration identifier included in the new message; and
   receiving new data from the host device based on changing the first characteristic of the first pseudowire connection and changing the second characteristic of the second pseudowire connection.

20. The method of claim 19, wherein the message is received via the first pseudowire connection with the first device and the new message is received via the second pseudowire connection with the second device.

* * * * *